(12) United States Patent
Pognant

(10) Patent No.: US 11,070,391 B2
(45) Date of Patent: Jul. 20, 2021

(54) METHOD FOR CONFIGURING, MONITORING OR SUPERVISING A HOME AUTOMATION INSTALLATION

(71) Applicant: OVERKIZ, Metz-Tessi (FR)

(72) Inventor: Sylvain Pognant, Seynod (FR)

(73) Assignee: OVERKIZ, Metz-Tessi (FR)

( * ) Notice: Subject to any disclaimer, the term of this patent is extended or adjusted under 35 U.S.C. 154(b) by 28 days.

(21) Appl. No.: 16/319,433

(22) PCT Filed: Jul. 20, 2017

(86) PCT No.: PCT/FR2017/051980
§ 371 (c)(1),
(2) Date: Apr. 10, 2019

(87) PCT Pub. No.: WO2018/015669
PCT Pub. Date: Jan. 25, 2018

(65) Prior Publication Data
US 2019/0268176 A1    Aug. 29, 2019

(30) Foreign Application Priority Data

Jul. 22, 2016    (FR) .................................. 16/56993

(51) Int. Cl.
*H04L 12/28*    (2006.01)
*G05B 23/02*    (2006.01)

(52) U.S. Cl.
CPC ...... *H04L 12/2829* (2013.01); *G05B 23/0267* (2013.01); *H04L 12/282* (2013.01);
(Continued)

(58) Field of Classification Search
CPC ...... G05B 2219/163; G05B 2219/2642; G05B 23/0267; H04L 12/2814; H04L 12/282; H04L 12/2829
See application file for complete search history.

(56) References Cited

U.S. PATENT DOCUMENTS 8,781,633 B2    7/2014 Fata et al.
9,152,737 B1   10/2015 Micali et al.
(Continued)

FOREIGN PATENT DOCUMENTS

WO    2015106766 A1    7/2015

OTHER PUBLICATIONS

International Search Report for Application No. PCT/FR2017/051980.
Written Opinion for Application No. PCT/FR2017/051980.

*Primary Examiner* — Kidest Bahta
(74) *Attorney, Agent, or Firm* — Cantor Colburn LLP

(57) ABSTRACT

The present invention relates to a method for configuring a management unit connected to at least one home automation equipment (17) comprising at least one home automation device (D) and at least one central control unit (U), the method being implemented by a management unit (Sv) and comprising the following steps: configuring (EcfSv2) an alert (AI) corresponding to the triggering of a notification (N) and/or an action (Ac) when a triggering condition (Cnd, Cndp) is produced relating to at least one state variable (S) for a home automation device (D), a group of home automation devices (D), a type of home automation device (DT) or a group of types of home automation devices (DT); the step of configuring an alert (AI) being carried out on the basis of instructions of a first user (Usr1) having a first user profile type (UsrT1); declaring (ECfUsr25) the monitoring of an assembly (SDS) of home automation devices (D) comprising at least one home automation device (D) for which at least one alert (AI) has been defined by a second user (Usr2) having a second user profile type (UsrT2). The present invention also relates to a method for controlling and monitoring said equipment.

20 Claims, 4 Drawing Sheets

(52) U.S. Cl.
CPC .... *H04L 12/2814* (2013.01); *G05B 2219/163* (2013.01); *G05B 2219/2642* (2013.01)

(56) References Cited

U.S. PATENT DOCUMENTS

| | | | |
|---|---|---|---|
| 2005/0143671 A1* | 6/2005 | Hastings | G06F 19/3418 |
| | | | 600/513 |
| 2005/0200474 A1 | 9/2005 | Behnke | |
| 2006/0238339 A1* | 10/2006 | Primm | G08B 13/19656 |
| | | | 340/540 |
| 2009/0062964 A1 | 3/2009 | Sullivan et al. | |
| 2010/0274366 A1* | 10/2010 | Fata | G06F 11/3048 |
| | | | 700/7 |
| 2013/0231782 A1* | 9/2013 | Lee | G06Q 10/10 |
| | | | 700/275 |
| 2014/0375440 A1* | 12/2014 | Rezvani | H04L 29/06 |
| | | | 340/12.29 |
| 2015/0127165 A1 | 5/2015 | Quam et al. | |
| 2015/0163412 A1* | 6/2015 | Holley | H04L 12/2803 |
| | | | 348/143 |
| 2016/0147207 A1* | 5/2016 | Park | G06F 3/0482 |
| | | | 700/275 |
| 2017/0191693 A1* | 7/2017 | Bruhn | H04N 21/4131 |

\* cited by examiner

METHOD FOR CONFIGURING, MONITORING OR SUPERVISING A HOME AUTOMATION INSTALLATION

CROSS REFERENCE TO RELATED APPLICATIONS

This application is a National Stage of PCT Application No. PCT/FR2017/051980 filed on Jul. 20, 2017, which claims priority to French Patent Application No. 16/569993 filed on Jul. 22, 2016 the contents each of which are incorporated herein by reference thereto.

FIELD OF THE INVENTION

The present invention concerns a method for configuring and a method for supervising a home automation installation.

PRIOR ART

A home automation installation of a building can comprise a plurality of home automation devices. It is known to proceed with the configuration, and the monitoring, that is to say with the control and/or the supervision of said installation by using a central control unit which communicates with one or several home automation device(s).

A plurality of home automation devices belonging to several distinct home automation installations can be supervised or maintained by maintenance operators. These should proceed with preventive maintenance or repair operations during a malfunction of a device.

These operations require travel to proceed with the operations, as well as on-site or remote surveillance that requires a considerable amount of time. Therefore, it is possible that the maintenance or repair operations are not executed within a satisfactory time because of the number of devices to supervise. It is also possible that the operations do not correspond to a situation requiring this intervention. Indeed, for supervision to be effective, maintenance operators should be able to anticipate and detect the occurrence of a malfunction on the basis of the information provided and/or their evolution, which requires a complex interpretation of said supervision information.

The present invention aims at solving all or part of the above-mentioned drawbacks.

DISCLOSURE OF THE INVENTION

To this end, the present invention concerns a method for configuring a management unit connected to at least one home automation installation comprising at least one home automation device and at least one central control unit, the method being implemented by a management unit and comprising the following steps of:
  Configuring an alert corresponding to the triggering of a notification and/or an action during the fulfilling of a trigger condition relating to at least one state variable for a home automation device, a group of home automation devices, a home automation device type or a group of home automation device types; the step of configuring an alert being carried out on the basis of the instructions of a first user having a user profile of a first type;
  Declaring the supervision of a set of home automation devices comprising at least one home automation device for which at least one alert has been defined by a second user having a user profile of a second type;

Thanks to the arrangements according to the invention, a notification can be communicated to a user of the second type when the condition for triggering an alert is met, on the basis of a configuration carried out by a user of the first type. Thus, the implementation of the maintenance of home automation devices is facilitated by limiting or more appropriately targeting maintenance or repair interventions on site. Indeed, the method implements a configuration that allows a first user of a first type to define at least one alert defining a condition for triggering a notification intended to be sent to the user having a profile of the second type when the trigger condition is met for a device comprised in the set associated with the user having a profile of the second type. An expert user of the first type can thus define relevant alerts for types of devices, so that users of the second type could be alerted wisely in the event of a prediction of a malfunction and thus optimize maintenance operations. It should be noted that the term configuration means the creation or update of an alert.

An alert corresponds to the triggering of a notification and/or an action when fulfilling a trigger condition relating to at least one state variable for a home automation device, a home automation device type or a list of home automation devices types.

The trigger condition contains a reference to at least one state variable of a device. The trigger condition can also take into account one or several external variable(s), for example corresponding to a value assigned by default and customizable per device instance. The trigger condition can also take into account previous values of one or several devices state variable(s), by exploiting a history-keeping capacity of the management unit in order to set up an algorithm and, for example, to estimate a variation rate in a derivative determination or to proceed with an anomaly detection by statistical analysis.

The trigger condition can be associated with a notion of temporal hysteresis or threshold hysteresis on the variation of one or several measured parameter(s). This hysteresis allows not triggering an alert in an abusive manner when the measured parameters are subject to fluctuation.

The trigger condition of the alert can be defined in the form of an expression of an evaluable interpreted or compiled language, by the server.

This language can be a simple language allowing describing Boolean expressions, by comprising in particular comparison operators and Boolean operators, or a complete programming language.

An alert can be associated with an alert level or priority level of the alert; As example, an alert can correspond to a level of information or to an alert concerning a problem blocking the installation.

A notification thus corresponds to sending information relating to the triggering of an alert to a user, according to a variable communication mode. Notifications can be communicated along with the current or collected in an interface that the user can consult when he wants. A combination of different modes for communicating the notification can also be set up. Thus, the communication mode for the notifications can be various, for example by SMS, by email, or on a dedicated communication interface.

It is possible to be notified on the occurrence of the alert but also on return to normal by detecting when the trigger condition is met, but also to obtain a notification when the condition ceases being met.

An action can be defined in case of fulfilling the condition, for example corresponding to a command on a device, in particular a setting/set-up of a degraded mode, or else a deactivation or a blocking of the device.

According to one aspect of the invention, the management unit is a server remotely connected to the at least one home automation installation, via a wide area network. It should be noted that the term server is a logical designation that can cover the use of several physical servers to distribute the computing load to be performed.

According to another aspect of the invention, the management unit is a central unit intended to be connected to one or several central control unit(s) on distinct private or local area networks, or else on the same local area network.

The first user or users having a first profile type correspond to an expert user who creates the alert. This first type of user profile has rights extended over all devices of a given type. This can be in particular the manufacturer of the devices or a distributor of home automation devices.

The second user or users having a second type of profile correspond to a user who can subscribe to an alert. This can be in particular an installer or a maintenance agent who has rights to devices that he has to supervise, in particular remotely.

In the context of the present invention, a home automation device is a home automation equipment and/or a sensor, or else a home automation equipment portion or a sensor portion corresponding to a functional subset. A home automation device can also correspond to a control point of other home automation devices.

In the context of the present invention, a home automation devices type corresponds to a category of devices which are identical, similar or sharing characteristics and at least one definition of a state variable. As example, a type can correspond to a particular model of shutter, alarm or portal.

In the context of the present invention, a message is an information element notified or received via a communication module from external equipment, or in the form of a synchronous or asynchronous call, which can also correspond to a local or remote function call.

In the context of the present invention, an installation is a set comprising a plurality of home automation devices and at least one central control unit disposed in a single building or on a plurality of locations, each home automation device being connected to a central control unit among the plurality of central control units, the plurality of central control units forming a group under the control of a user. The electronic devices form groups of at least one home automation device related to a central control unit.

In the context of the present invention, a central control unit of the home automation installation is an electronic unit comprising:
  at least one processing unit for containing and executing at least one computer program,
  at least one communication module intended to monitor and/or control at least one home automation device; and
  at least one module for communication with the management unit.

The electronic unit can be independent or integrated into a home automation device. In the latter case, the communication module intended to monitor and/or control the device can be a communication module internal to the home automation device and/or a communication module intended to for monitor and/or control other home automation devices.

In some applications, a central control unit can communicate with the management unit through an intermediate management unit, for example a third-party service provider, whose intermediate management unit offers a service interface or API.

The central control unit may also be integrated in a router and/or a modem achieving a connection to a wide area network, in particular to the Internet.

In the context of the present invention, a state variable is a descriptive element of the state of a home automation device. The value of a state variable can correspond to the switching on or off for a switch, or a degree or percentage of opening for a shutter. Moreover, a state variable can correspond to a measurement value of a sensor, for example to a value of a physical or environmental quantity. The description of the states of the devices can be generic or specialized, depending on the local protocol. The identifiers of the state variables can be numeric or alphanumeric. The values of the state variable can use customized or proprietary formats or scales.

In the context of the present invention, a command corresponds to an order that can be given to a home automation device for the purpose of carrying out an action by this device or obtaining information in return, for example from a piece of information relating to a state variable of this device.

According to one aspect of the invention, the declaration step is performed on the basis of instructions from the second user. According to another aspect of the invention, the declaration step can also be performed automatically on the basis of a list of users of the second type and associated devices.

According to one aspect of the invention, the method comprises the following step of:
  Recording a first correspondence between said alert and said home automation device, said group of home automation devices, said home automation device type or said group of home automation devices types;

According to one aspect of the invention, the method comprises the following step of:
  Recording a second correspondence between the at least one device belonging to the set of home automation devices and a user.

According to one aspect of the invention, the method further comprises the following step of:
  Defining a customized configuration of an alert related to a device or a device group, by the second user having a user profile of a second type.

A user of the first type can set the condition variably. A user of the second type can then modify alerts created by a user of the first type for the devices under his supervision.

According to one aspect of the invention, the method comprises a step of configuring an alert corresponding to the triggering of an alert notification and/or an action during the fulfilling of a trigger condition relating to at least one state variable for the type of home automation device or the group of home automation devices types; the step of configuring an alert being carried out on the basis of at least one instruction of a first user having a user profile of a first type.

As example, a condition can be defined by a user of the first type with a variable threshold, optionally associated with a constraint. For example, the threshold could be modified within the limits of an interval. In this case, the customized configuration can correspond to a choice of a threshold value in a condition, by giving a customized threshold value, comprised within the limits of the interval.

According to one aspect of the invention, the method comprises the following step of:

Providing the user having a profile of a first type with a first interface for configuring an Alert and the corresponding trigger condition.

According to one aspect of the invention, the first interface is arranged to enable the selection of the device types and/or of the state variables to configure an alert and/or the corresponding trigger condition.

According to one aspect of the invention, the method further comprises the following step of:

Providing the user having a profile of a second type with a second interface for selecting installations, devices/parameters or state variables.

Via this interface, a user of the second type can in particular proceed with the definition of a communication mode for the notifications, for example by SMS, by email, or on a dedicated communication interface. A combination of communication modes can also be considered. As example, an SMS or email notification can be sent with a link to a page of a supervision interface.

The user of the second type can also proceed with a definition of the alert notifications he wishes to receive per device type but also per supervised device instance.

The second interface optionally allows proceeding with the customized configuration of the alerts.

The present invention also concerns a method for supervising a home automation installation comprising at least one home automation device and at least one central control unit, the method being executed by a management unit connected to said installation and comprising the following steps of:

Receiving a supervision message coming from a home automation device and/or from a central control unit, the supervision message comprising an information relating to a value of at least one state variable of the at least one home automation device;

Determining at least one alert having a trigger condition to be evaluated for the home automation device; an alert corresponding to the triggering of a notification and/or an action during the fulfilling of a trigger condition relating to at least one state variable for a home automation device;

Evaluating the trigger condition of the alert;

Determining at least one user to be notified depending on a correspondence between the device and said user, in the case where the trigger condition is met;

Emitting at least one notification message to the at least one user in the case where the trigger condition is met.

According to one aspect of the invention, the supervision method comprises the steps of the configuration method which are carried out prior to the step of receiving a supervision message.

According to one aspect of the invention, the step of receiving a message can be subsequent to a first step of sending an interrogation or polling message. Alternatively, the sending of the message can be initiated by the home automation device autonomously, for example by detecting an event modifying the value of a state variable. Polling can also be carried out at the initiative of the central control unit, before sending a notification to the server.

According to one aspect of the invention, the step of identifying a type can be based for example on a consultation of information sent in the supervision message, such as an identifier.

According to one aspect of the invention, the step of determining the alerts having a condition to be evaluated can be carried out on the basis of the correspondences recorded during the configuration. According to one aspect of the invention, it is possible to reduce the number of conditions to be evaluated by considering the state variable(s) concerned by the condition and comparing them with the updated state variable.

According to one aspect of the invention, a notification can be associated with a context, or values to be communicated, and/or with an alert level.

According to one aspect of the invention, the method comprises a step of identifying a type of the home automation device concerned by the supervision message, the step of determining the alerts having a condition to be evaluated, is carried out on the basis of the type of the home automation device.

According to one aspect of the invention, the at least one alert is configured by a first user having a profile of a first type, and the step of determining a user to be notified corresponds to the determination of a second user of a second type.

According to one aspect of the invention, the server can proceed with a backup of the triggering of the alert to constitute an alert history.

According to one aspect of the invention, the method comprises the following step of:

Sending a message to the central control unit U for triggering the execution of an action, in particular an action on the home automation device.

According to one aspect of the invention, the method comprises the following step of:

Storing the values of the at least one state variable.

These arrangements enable the evaluation of trigger conditions relating to several variables that are not sent at the same time and/or to base conditions on a history of values.

According to one aspect of the invention, the method comprises the following step of:

Verifying the existence of a customized configuration of the alert per device by a second user having a profile of the second type.

According to one aspect of the invention, the method comprises the following step of:

Verifying the existence of a user-specific configuration concerning a wish to receive notification in order to determine whether a notification is sent or not.

The different aspects defined above that are not incompatible can be combined.

BRIEF DESCRIPTION OF THE FIGURES

The invention will be better understood using the detailed description which is set out below with reference to the appended drawing in which.

DESCRIPTION WITH REFERENCE TO THE FIGURES

In the following detailed description of the figures defined above, the same elements or the elements fulfilling identical functions might retain the same references so as to simplify the understanding of the invention.

Description of a System Comprising a Home Automation Installation

Figure 1:
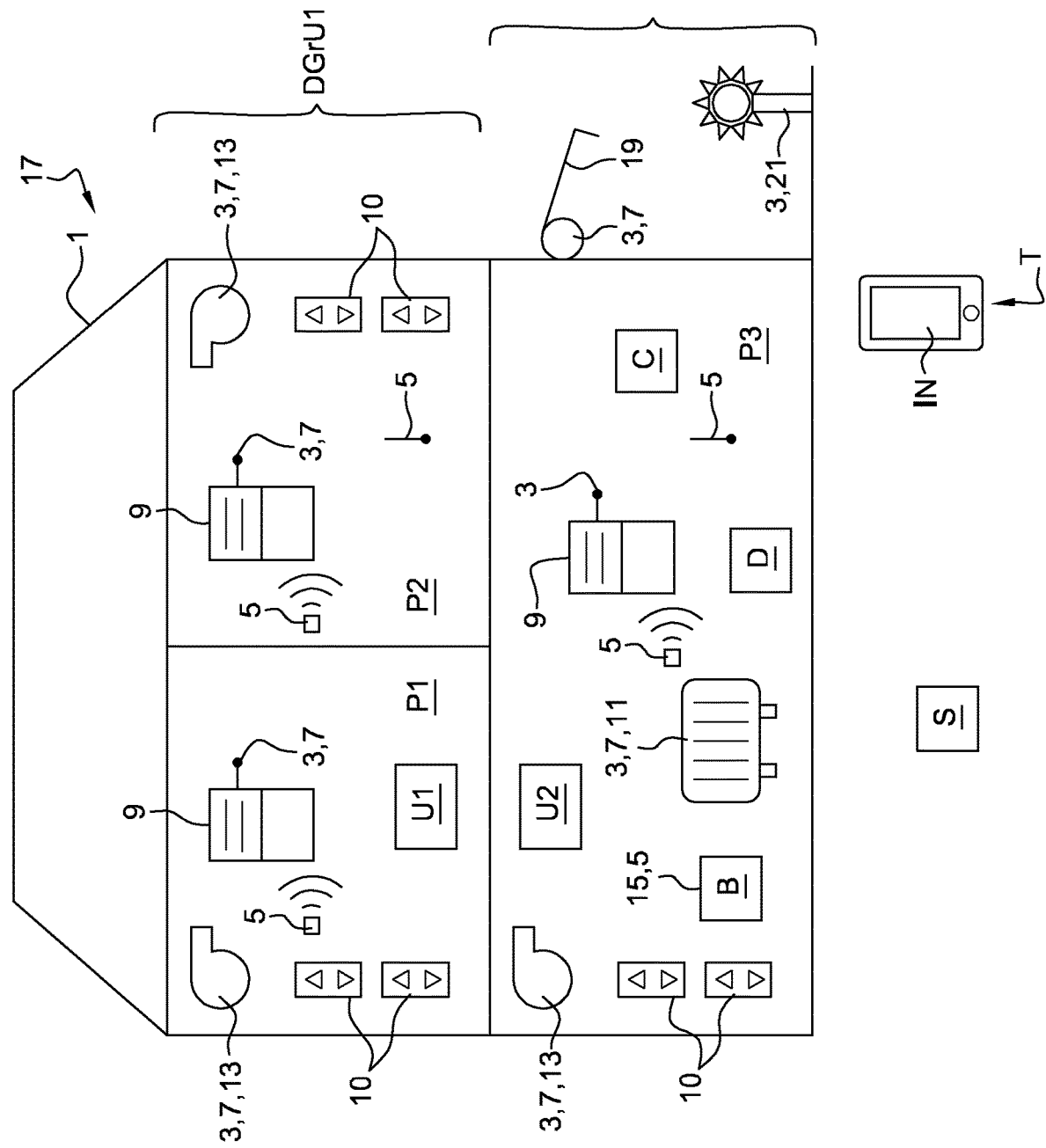
FIG. 1 is a schematic view of a building and a home automation installation in accordance with one embodiment of the invention.

As illustrated in FIG. 1, a building 1 comprises, as example, three rooms P1, P2, P3. The building 1 also comprises home automation equipment 3 and sensors 5.

A home automation equipment 3 can be an actuator arranged to displace or adjust a building element 1, for example an actuator 7 to displace a rolling shutter 9 or a terrace blind 19, or a regulation system 10 for a heater 11 or an aeraulic system 13. A home automation equipment 3 can also be a lighting, for example a terrace outdoor lighting 21 or a lighting control system, an alarm system, or else a video camera, particularly a video-surveillance camera.

The home automation installation 17 can also comprise a control point 15 of an actuator 7, such as a wireless control case B for the rolling shutter 9.

The home automation installation 17 can comprise one or several sensor(s) 5, integrated with an actuator 7, a control point 15 or else the control case B, or independent of these elements. A sensor 5 can, in particular, be arranged to measure a physical quantity, for example a temperature sensor, a sun lighting sensor or a humidity sensor. Position sensors 5 of home automation equipment 3 of the building 1, such as, for example, sensors of the open state of a rolling shutter 9 or position sensors of a door leaf such as a window, whether motorized or not, can also be provided. The home automation installation can also comprise one or several presence sensor(s).

A home automation equipment 3 and a sensor 5 are thus to be considered as units having available information on observed actual states of elements of the building 1 and being able to share this information with other elements of the home automation installation 17.

The home automation equipment 3 and the sensors 5 can thus have access to any measurable physical quantity, such as the temperature of each room P1, P2, P3 or a state of an element of the building 1, as the opening state of a rolling shutter 9, the status of an alarm, etc.

Subsequently, we will use the designation of home automation device or device D indifferently to designate sensors or home automation equipment, or else portions of home automation equipment 3 or sensors 5.

The home automation installation 17 comprises a central control unit or a plurality of central control units U1, U2. In particular and as example, two central control units U1, U2 are represented in FIG. 1. According to a variant, a home automation installation can also comprise one single central control unit.

Each central control unit U1, U2 is arranged for controlling and/or monitoring a portion of the devices D of the installation 17 forming a group DGrU1, DGrU2. As example, in FIG. 1, the central control unit U1 is in charge of the devices D disposed in the rooms P1 and P2 of the first floor of the building, while the central control unit U2 is in charge of the devices D disposed in the room P3 on the ground floor of the building and of the external devices.

In particular, the control and/or the monitoring is performed remotely, in particular by using a wireless communication protocol, for example a radio communication protocol. Each central control unit U1, U2 is arranged to group all data coming from the devices D of the group DGrU1, DGrU2 thereof and to process these data.

Figure 2:
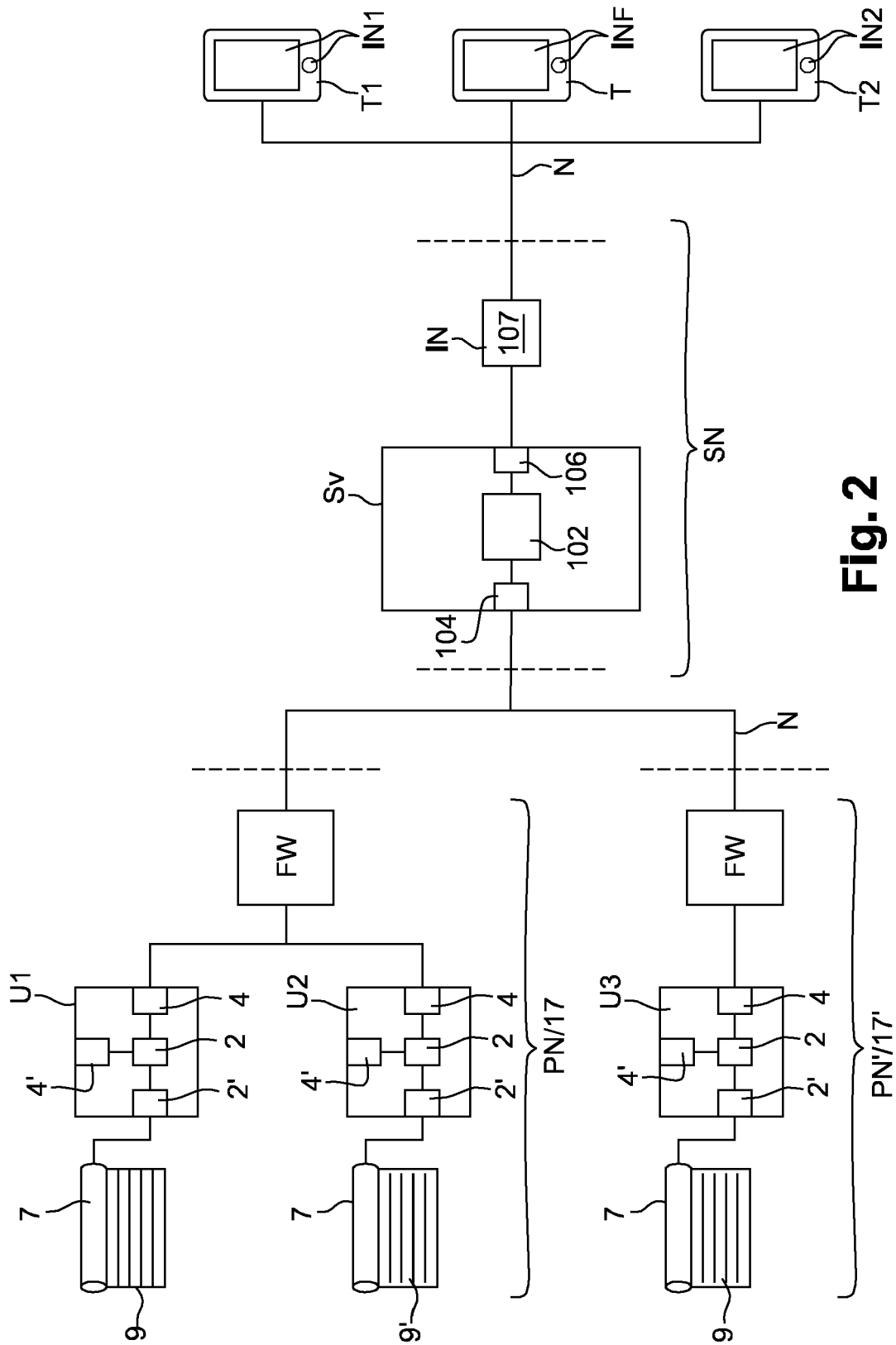
FIG. 2 is a diagram showing an architecture of a system comprising the home automation installation illustrated in FIG. 1, a second home automation installation, as well as a server intended to be connected to a user terminal.

As represented in FIG. 2, each central control unit U is arranged to communicate with a server Sv.

The central control units U1, U2, U3 are disposed on a private network PN, PN', whose access is generally protected by a firewall FW. In particular, in the example represented in FIG. 2, two central control units U1, U2 are disposed on a first private network corresponding to a first home automation installation, while a third central control unit U3 is disposed on a second private network PN', independent of the private network PN corresponding to a second home automation installation 17'. The server Sv is also disposed on a private network SN. The private network PN is connected to a wide area network N, for example Internet. Of course, the server Sv is arranged to communicate with a set of such central control units U. We will describe one of these units later.

A central control unit U comprises a processing unit 2 arranged to contain and execute a first computer program. As example, the processing unit 2 comprises a processor, a storage flash memory as well as a random access memory, and an Ethernet chip.

The central control unit U further comprises at least one communication module 2' intended for the monitoring and/or the control of home automation equipment 3 and/or sensors 5, the home automation equipment 3 might be actuators 7, lightings 21, an alarm system, or a video camera.

As example, as represented in FIG. 2, the communication module 2' allows the monitoring and the control of at least one actuator 7, of a movable element of the building 1, such as for example a roller shutter 9, or an orientable sunshade 9' or other actuators 7 or lightings 21, as previously described with reference to FIG. 1, according to the first local communication protocol P1.

As example, the communication module 2' can be arranged to implement for example one or more of the first local protocols P1 such as for example Z-Wave, EnOcean, IO Homecontrol, Somfy RTS, KNX, MODBUS, Wavenis, Philips HUE. In general, these first local protocols are non-IP local communication protocols.

According to another possibility, for example in the context of alarm systems, the central control unit can be integrated in the home automation device. According to yet another possibility, it is also possible for the central control unit to be integrated in a router and/or a modem achieving a connection to a wide area network, in particular to the Internet.

The reception of information from a sensor 5 providing information on the presence of a user or values of the surrounding parameters, such as temperature, humidity and brightness, is also provided. In the same manner, the central unit U can allow the monitoring and/or the control of an alarm system.

Each central control unit U may further comprise a communication module 4' for communicating according to a second target communication protocol P2, with a mobile communication terminal T. The second target communication protocol can for example be a communication protocol above the IP protocol on a local area network, or else a generic point-to-point protocol. As example, the WEAVE application protocol using 6lowpan and thread transport protocols for a mesh network can constitute a second target protocol. Other examples include Bluetooth, Zigbee or Wifi.

The communication terminal T can contain and execute an application software APP.

Each central control unit U further comprises a module 4 for communication with the server Sv. The server Sv enables the remote control and/or monitoring and comprises one or several processing unit(s) 102 arranged to contain and execute a second computer program.

In some applications, a central control unit U can communicate with the server Sv through an intermediate server, for example a third-party service provider, whose intermediate server provides a service interface or API. In turn, the server Sv comprises at least one communication interface 104 intended for the communication with the central unit U.

The server Sv can also comprise a communication interface 106 intended for the communication with a control and/or monitoring interface INF enabling an end-user to remotely monitor the home automation installation.

It should be noted that the term server is a logical designation which can cover the use of several physical servers to distribute the computer processing load to be carried out.

The control and/or monitoring interface INF comprises, for example, a web server 107 and a mobile communication terminal T communicating by the wide area network N. The mobile communication terminal T can be, for example, a smartphone or a tablet. The mobile communication terminal T can be the same or a terminal of the same type as that with which the central control unit U locally communicates by means of the communication module 4', or a different terminal. We will indifferently designate these mobile terminals by the reference T.

The control and/or monitoring interface IN comprises a processor which can be disposed at the level of the web server 107 and/or the mobile communication terminal T.

The processor of the control and/or monitoring interface IN is arranged to use a third computer program. In turn, this third computer program is arranged to execute a downloadable application.

The mobile communication terminal T comprises a data input device and a display device, for example in the form of a touch control portion of a screen of the terminal T and in the form of one or several button(s) of the terminal T.

Unique Identifier of a Home Automation Device

The server Sv and the central control units U can use a unique identifier to identify the home automation devices. The structure of a unique identifier of a home automation device DURL will now be described correspondingly to a particular embodiment.

According to this embodiment, the unique identifier of a home automation device comprises information on:
  The local native protocol of the home automation device ID,
  The communication path to the device D, including the intermediate central control units U and the end addresses to be crossed, organized or not in a hierarchical topology;
  A subsystem identifier subsystemId if the device belongs to a group of devices D associated with the same address. The devices that have a unique expression of an address do not have an identification extension of a subsystem.

Thus, the form of the unique identifier of a device DURL can be as follows:
  <protocol>://<gatewayId>/<rawDeviceAddress>(#<subsystem Id>)
In which the following fields are present:
  protocol: identifier of the native device local protocol;
  gatewayId: identifier of the first central control unit U, for example a serial number or a unique identifier.

rawDeviceAddress: a simple or several-level path. Its meaning and format depend on the addressing scheme of the local communication protocol of the device D.
  subsystemId: this optional field indicates an identification, for example a row of the subsystem (starting for example at 1), if such a subsystem is present.

EXAMPLES 1) knx://0201-0001-1234/1.1.3
This unique identifier DURL corresponds to a device D communicating by the protocol KNX with an individual address 1.1.3 accessible by the central control unit U bearing the identifier #0201-0001-1234.

2) io://0201-0001-1234/145036 #2
This unique identifier of a device GDURL corresponds to a subsystem bearing No. 2 associated to a device D communicating by the protocol io homecontrol with a radio address 145036 accessible by the central control unit U bearing the identifier #0201-0001-1234.

First and Second Types of Users

As represented in FIG. 2, the server Sv can communicate with terminals in possession of two types of users who are not necessarily the end-user(s) of the installation 17.

In particular, the server Sv can interact with at least one first user Usr1 having a user profile of a first type UsrT1. The first type of user UsrT1 corresponds to an expert user who has extensive rights over all the devices D of a given type DT. This can include in particular the devices' manufacturer or a distributor of the concerned home automation devices.

To this end, an interface IN1 is made available by the server Sv. Access to this interface can be achieved by an application executed on a user terminal T1 of the first user Usr1, or by access by a light client.

The server Sv also interacts with at least one second user Usr2 having a user profile of a second type UsrT2. The second type of user Usr2 corresponds in particular to an installer or a maintenance agent who has rights on devices that he has to supervise, in particular remotely.

To this end, an interface IN2 is made available by the server Sv. Access to this interface can be achieved by an application executed on a user terminal T2 of the second user, or by access by a light client.

Subsequently, we will designate by user of the first type UsrT1 a user having a user profile of the first type UsrT1 and by user of the second type UsrT2 a user having a user profile of the second type UsrT2.

Configuration Method

First Mode of Implementation

Figure 3:
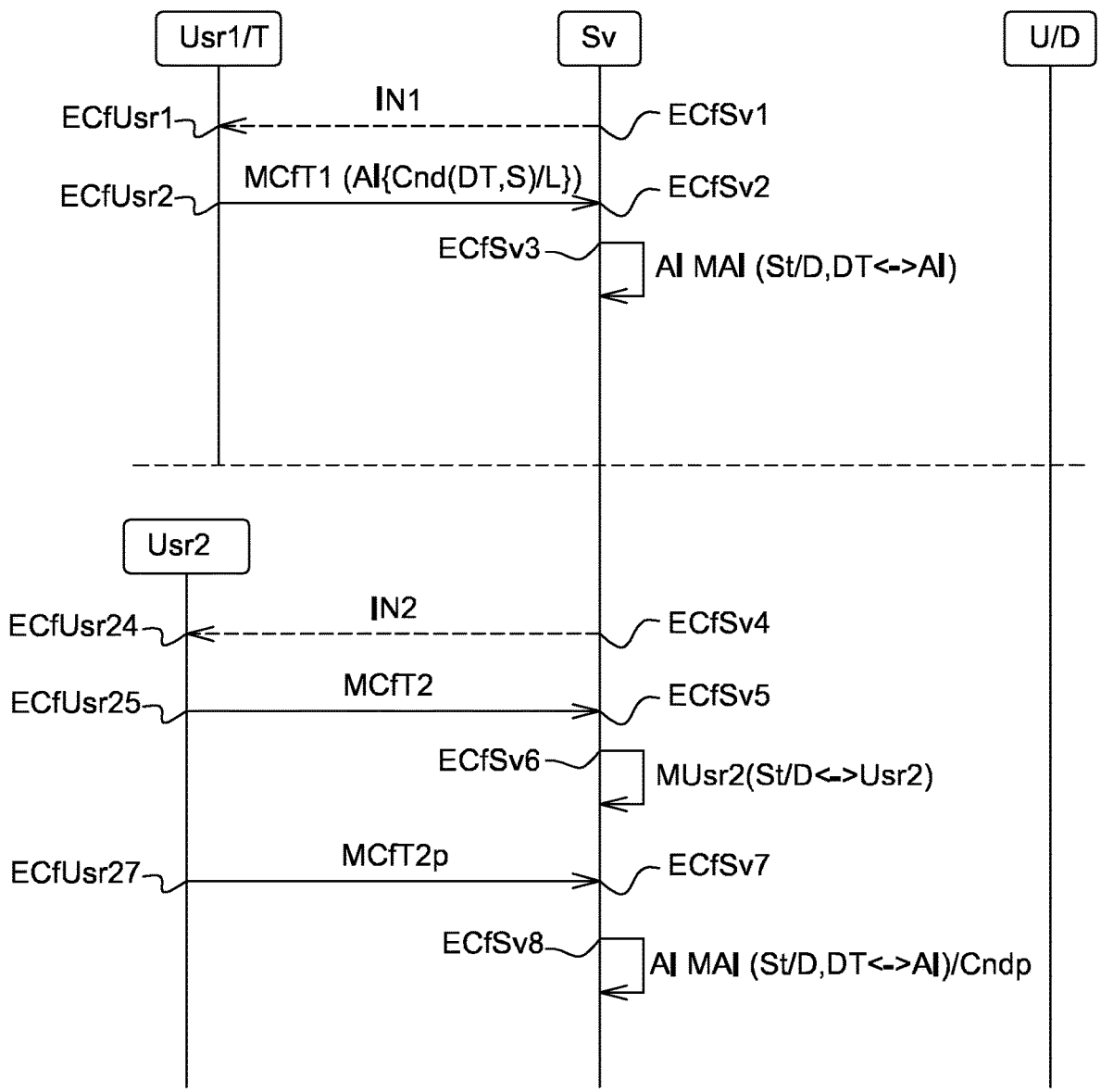
FIG. 3 is a diagram illustrating an implementation of a method for configuring a home automation installation according to the invention.

We will now describe a first embodiment of a method for configuring a home automation installation 17 with reference to FIG. 3, the method being executed by the server Sv.

At a step EcfSv1, the Server Sv makes available to a first user Usr1 of the first type UsrT1 the interface IN1, in particular for the selection of the devices types/parameters or state variables in order to enable the configuration of an alert AI and the corresponding trigger condition Cnd.

At a step EcfUsr2, the user Usr1 of the first type proceeds with the creation and/or the configuration of an alert AI.

An alert AI corresponds to the triggering of a notification N and/or of an action Ac when fulfilling a condition relating to at least one state variable S for a device D, a device type DT or a list of devices types DT is made if the at least one state variable S is supported by the concerned devices. The first user Usr1 has extensive rights over all the devices D or types of devices DT concerned by the alert AI in order to be able to create and configure it.

The trigger condition Cnd of the alert AI can be defined in the form of an expression of a language which is evaluable, interpreted or compiled by the server.

This language can be a simple language allowing describing Boolean expressions, by comprising in particular comparison operators and Boolean operators, or a complete programming language.

The trigger condition Cnd contains a reference to at least one state variable S of a device D. The trigger condition Cnd can also take into account one or several external variable(s), for example corresponding to a value assigned by default and customizable by device instance. The trigger condition Cnd can also take into account previous values of one or several state variable(s) of devices D, by exploiting the history-keeping capacity of the server Sv in order, for example, to estimate a speed of variation by determining a derivative or to proceed with anomaly detection by statistical analysis.

The trigger condition Cnd can be associated with a notion of temporal hysteresis or threshold hysteresis on the variation of one or several measured parameter(s). This hysteresis allows not triggering an alert in an abusive manner when the measured parameters are subject to fluctuation.

An alert AI can be associated with an alert level or priority level of the alert; As example, an alert can correspond to a level of information or an alert concerning a blocking problem on the installation.

It is possible to be notified on the appearance of the alert but also on return to the normal condition by detecting when the triggering condition is met, but also to obtain a notification when the condition ceases being met.

It is possible to define the condition in a constant or variable manner, for example with a variable threshold T, optionally associated with a constraint. For example, the threshold could be changed within the limits of an interval. These arrangements enable customization as will be described later.

An action Ac can be defined in case of fulfilling the condition, corresponding for example to a setting/set-up of a degraded mode, or else a disabling or blocking of the device.

A condition Cnd can take into account historical data on a state variable in order to set up an algorithm. It is also possible to combine several state variables S in the condition.

Examples of conditions Cnd will be described later.

At a step EcfSrv3, the server records the alert AI and at least one correspondence MAI between said alert AI and the devices D, devices groups, type or groups of devices types DT, the installation or the group of installations. The server can thus maintain, as example, one or several table(s) of correspondence between installations or devices or types of devices and the alerts that can be applied.

At a step EcfSv4, the server makes available the user interface IN2 to at least one user of a second type, in particular for the selection of installations, devices/parameters or state variables.

The second type of user Usr2 corresponds to a user who can subscribe to an alert. This can include in particular an installer or a maintenance agent who has rights on devices that he has to supervise, in particular remotely.

Optionally, one or several alert(s) AI created by a user of the first type can be modified by a user of the second type UsrT2 for the devices D that he has to supervise.

At a step ECfUsr25, a user Usr2 having a profile of a second type proceeds with a declaration of the installations St and or the devices D that he supervises. This declaration step can also be performed automatically on the basis of a list of users of the second type and associated devices D and/or installations St.

During this step, a user of the second type can in particular proceed with the definition of a communication mode for the notifications, for example by SMS, by email, or on a dedicated communication interface. A combination of modes of communication can also be considered. As example, an SMS or email notification can be sent with a link to a page of a supervision interface.

The user of the second type Usr2 can also proceed with a definition of the alerts notifications that he wishes to receive per device type DT but also per supervised device D instance. This definition corresponds to a customization of the profile of the user. The user of the second type can also proceed with a customization of the alerts on the home automation devices that he has to supervise.

At a step ECfSv6, upon receipt of the configuration message MCfT2, the server proceeds with a record of the correspondence MUsr2 between an installation St or a device D and a user of the second type Usr2. The server can thus maintain, as example, one or several table(s) of correspondence between installations or devices and the users of the second type in charge of the supervision of these devices or installations.

At a step ECfUsr27, a user of the second type Usr2 can proceed with a customized configuration per device D, per device group D or per installation St of an alert AI related to this device D, device group, installation St or installation group. In this case, the user of the first type should have given the possibility of modifying the Alert AI to users of the second type. As example, the customized configuration can correspond to a choice of threshold value in a condition Cnd, by giving a customized threshold value Tp.

This customization Cndp can be stored at a step EcfSv28 in a manner related to a device with the correspondence MAI, or in connection with the user Usr2 in connection with the correspondence MUsr.

Supervision Method

First Mode of Implementation

Figure 4:
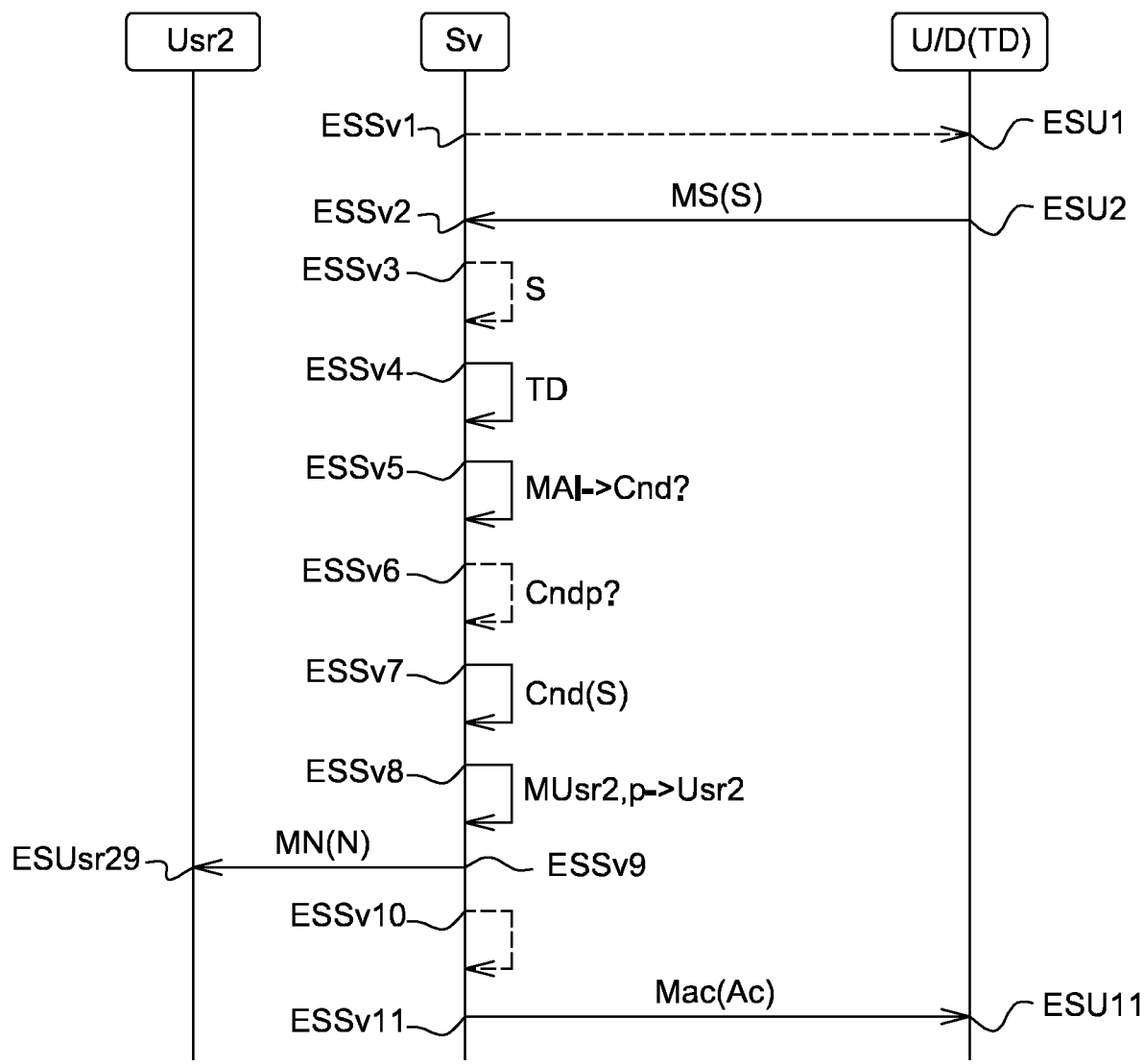
FIG. 4 is a diagram illustrating an implementation of a method for supervising a home automation installation according to the invention.

We will now describe an embodiment of a method for supervising a home automation installation 17 with reference to FIG. 4. We will herein assume that the configuration method as described in FIG. 3 has been previously executed.

The supervision method is executed by the server Sv.

At a step ESSv2, the server Sv receives a supervision message MS emitted by a home automation device D and relayed by the central control unit U at a step ESU2, the supervision message MS comprising information relating to a value of at least one state variable S of the at least one home automation device D. Step ESU2 can be subsequent to a first step ESSv1 of sending an interrogation or polling message, received by the home automation device D or the central control unit U at a step ESU1. The term polling herein means periodic interrogation. Alternatively, the sending of the message MS can be initiated by the home automation device D autonomously, for example by detecting an event modifying the value of a state variable 51D. The polling can also be achieved on the initiative of the central control unit U, before sending a notification to the server Sv.

At a step ESSv3, the server can carry out an optional storage of the values of the at least one state variable S. This historized storage of the state variable values can be useful for the evaluation of conditions Cnd relating to several variables which are not sent at the same time, to implement algorithms based for example on the evolution of the values of the state variable S, on the calculation of statistical quantities, or to implement a hysteresis mechanism.

At a step ESSv4, the server Sv proceeds with an identification of the device type DT. This identification of the type can be based for example on a consultation of information sent in the supervision message, as an identifier. As example, the data of the unique identifier DURL can be used.

At a step ESSv5, the server proceeds with a determination of the alerts AI having a condition Cnd to be evaluated, based on the type TD of the device D. This determination can be made on the basis of the correspondences MAI recorded during the configuration.

It is also possible to reduce the number of conditions Cnd to be evaluated by considering the state variable(s) S concerned by the Condition Cnd and by comparing them with the updated state variable.

At a step ESSv6, the server Sv verifies the existence of an «Overload», that is to say that it proceeds with a verification of a customized configuration Cndp of the alert per device D by a user of the second type Usr2. As example, a modification of the threshold Tp can be carried out.

At a step ESSv7, the server Sv proceeds with the evaluation of the condition Cnd, to determine whether an alert should be triggered.

In the case where the condition is met and an alert AI is triggered which must be notified, this notification can optionally be associated with a context, or values to be communicated, and/or with an alert level.

At a step ESSv8, the server Sv determines the user or users of the second type Usr2 to be notified according to the correspondence between the device D/the installation and the user. Moreover, the notification is sent or not according to the configuration specific to the user Usr2 who wishes to receive an alert or not.

At a step Essv9, the server Sv proceeds with sending of at least one notification message MN if the determination of the condition Cnd is positive. This notification message MN is received by the user at a step ESUsr29.

At a step ESSv10, the server can optionally proceed with a backup of the triggering of the alert to constitute an alert history.

At a step ESSv11, the server can proceed with sending of a message Mac to the central control unit U in order to trigger the execution of an action Ac, in particular an action on the home automation device D. This message is received at a step ESU11 by the central control unit U. By action, it may in particular be understood a command on a device D.

Examples of Alert Trigger Conditions

Some examples of conditions Cnd used in alerts AI are described below.

Example 1

According to a first example, the condition Cnd of triggering an alert AI aims at detecting ignition problems on a device D constituted by a household boiler.

Thus, the trigger condition Cnd can be defined as:

$Na > NaT$

With

Na: Number of consecutive attempts required for combustion to start at last ignition.

NaT: alert threshold, for example equal to 3.

This condition Cnd defines that if the value of Na exceeds the threshold NaT, the alert AI is triggered.

This type of condition Cnd allows detecting misfires ignition on the boiler, indicating wear of the ignition system requiring replacement before aggravation and total failure.

Example 2

According to a second example, the condition Cnd of triggering an alert AI aims at monitoring the operation of a device D constituted by a household boiler.

Thus, the trigger condition Cnd can be defined as:

$T > \$Tmax$ during a period P with

T: Temperature of the heating body. This temperature is a state variable or parameter of the device whose value is refreshed every minute $TMax: Threshold temperature. This threshold value is an external variable which can for example be defined by default at a value of 90° C. by the manufacturer's recommendations.

P: Period of time, for example 10 minutes.

The above condition uses a «hysteresis» for a period of time P. Thus, if the value of T exceeds $TMax over an uninterrupted period of at least P, the alert is triggered.

Example 3

According to a third example, the condition Cnd aims at detecting any abnormal force on a device D constituted by a motorized garage door.

Thus, the trigger condition Cnd can be defined as:

$Nt > NtT$ and $Im > ImT$ with

Nt: Number of opening/closing cycles of the device since it was shipped from the factory.

$Ntmax: Threshold of use, for example in the range of 100.

Im: Maximum value reached by the electrical current in the motor of the device (in amperes) during the last cycle.

$Immax: Current alert threshold, for example equal to 8 A.

The condition Cnd comprises two cumulative sub-conditions. The sub-condition on Nt allows avoiding false positives during the installation and break-in phase of the device.

Subsequently, if the device has performed at least NtT opening cycles and the inrush current of the electric motor exceeds ImT, the alert AI is triggered.

This type of condition Cnd allows detecting an abnormal force of the device that can reduce its service life or precede a complete blockage.

Example 4

According to a fourth example, the condition Cnd aims at monitoring the acid consumption of a home automation device D of the automatic pH regulator type for swimming pools.

Thus, the trigger condition Cnd can be defined as:

$d(Qa) > \$Cmax$ during a period P with

Qa: Amount of acid consumed in ml (absolute index, refreshed every 30 minutes)

d(Qa): Acid consumption rate in ml per hour, calculated by derivative over the last 8 hours (using the values stored by the server every 30 minutes)

$Cmax: Threshold consumption rate in ml per hour: external variable of default value=10 mL/h P: period of time, for example 8 minutes.

If the volume consumption of acid is greater than $Cmax ml/h over the last P hours, the alert is triggered.

This type of condition allows detecting an abnormal regulation situation leading to overconsumption, which can indicate a setting problem or a deterioration of the device.

Customized Configuration

According to one possibility, in the different examples described above, the first user of the first type UsrT1 can define that the defined thresholds could be adjusted by a user of the second type UsrT2, for example adjustable within a range of values determined by the user of the first type UsrT1.

The invention claimed is:

1. A method for configuring a management unit connected to at least one home automation installation comprising at least one home automation device and at least one central control unit, the method being implemented by the management unit and comprising the following steps of:

configuring an alert corresponding to a triggering of a notification and/or an action during a fulfilling of a trigger condition relating to at least one state variable for the at least one home automation device; the step of configuring the alert being carried out on a basis of instructions of a first user having a user profile of a first type, the user profile of the first type having rights that extend over all devices of a given type including the at least one home automation device;

declaring a supervision of a set of home automation devices comprising the at least one home automation device for which the alert has been defined by a second user having a user profile of a second type, the user profile of the second type having rights that extend over the set of home automation devices, the second user supervising the set of home automation devices; and wherein the at least one home automation device corresponds to a category of devices which are identical or sharing characteristics and at least one definition of a state variable, and wherein the user profile of the first type corresponds to a first category of the user profile which have identical or sharing rights and the user profile of the second type corresponds to a second category of the user profile which have identical or sharing rights different from the rights of the first category of the user profile, wherein the second user upon receipt of the alert can perform maintenance on the at least one home automation device according to the alert.

2. The method according to claim 1, comprising the following step of:

recording a first correspondence between the alert and the at least one home automation device.

3. The method according to claim 1, comprising the following step of:

recording a second correspondence between the at least one automation device belonging to the set of home automation devices and the second user.

4. The method according to claim 1, further comprising the following step of:

defining a customized configuration of an alert related to a device or a device group, by the second user having the user profile of a second type.

5. The method according to claim 1, further comprising the following step of:

providing the first user having the profile of the first type with a first interface for configuring an alert and with the corresponding trigger condition.

6. The method according to claim 1, further comprising the following step of:

providing the second user having the profile of the second type with a second interface for selecting installations, devices/parameters or state variables.

7. A method for supervising a home automation installation comprising at least one home automation device and at least one central control unit, the method being executed by a management unit connected to the installation and comprising the following steps of:

receiving a supervision message coming from the at least one home automation device and/or from the at least one central control unit, the supervision message comprising an information related to a value of at least one state variable of the at least one home automation device;

determining at least one alert, configured on a basis of the instructions of a first user having a profile of a first type, having a trigger condition to be evaluated for at least one the home automation device; the at least one alert corresponding to the triggering of a notification and/or an action during the fulfilling of a trigger condition relating to the at least one state variable for the at least one home automation device, the profile of the first type having rights that extend over all devices of a given type including the at least one home automation device;

evaluation the trigger condition of the at least one alert;

determining at least one second user having a user profile of a second type, to be notified according to a correspondence between the at least one home automation device and the at least one second user, in the case where the trigger condition is met, the user profile of the second type having rights that extend over a set of home automation devices, the at least one second user supervising the set of home automation devices; and emitting at least one notification message to the at least one second user having the user profile of the second type, in the case where the trigger condition is met, wherein the second user upon receipt of the at least one notification message can perform maintenance on the at least one home automation device according to the at least one notification message.

8. The method according to claim 7, comprising a step of identifying a type of the at least one home automation device concerned by the supervision message, and wherein the step of determining the at least one alert having the trigger condition to be evaluated, is carried out on the basis of the type of the at least one home automation device.

9. The method according to claim 7, wherein the at least one alert is configured by the first user having the profile of the first type, and the step of determining the at least one second user to be notified corresponds to the determination of the at least one second user of the second type.

10. The method according to claim 5, comprising the following step of:

sending a message to the central control unit for triggering the execution of an action, in particular an action on the at least one home automation device.

11. The method according to claim 5, comprising the following step of:

storing the values of the at least one state variable.

12. The method according to claim 5, comprising the following step of:
   verifying the existence of a customized configuration of the alert per the at least one home automation device by the second user having the profile of the second type.

13. The method according to claim 7, comprising the following step of:
   verifying the existence of a user-specific configuration concerning a wish to receive notification in order to determine whether a notification is sent or not.

14. The method according to claim 2, comprising the following step of:
   recording a second correspondence between the at least one device belonging to the set of home automation devices and the second user.

15. The method according to claim 2, further comprising the following step of:
   providing the second user having the profile of the second type with a second interface for selecting installations, devices/parameters or state variables.

16. The method according to claim 8, wherein the at least one alert is configured by the first user having the profile of the first type, and the step of determining the at least one second user to be notified corresponds to the determination of the at least one second user of the second type.

17. The method according claim 6, comprising the following step of:
   storing values of the at least one state variable.

18. The method according to claim 6, comprising the following step of:
   verifying the existence of a customized configuration of the alert per the at least one home automation device by the second user having the profile of the second type.

19. The method according to claim 7, comprising the following step of:
   verifying the existence of a customized configuration of the alert per the at least one home automation device by the second user having the profile of the second type.

20. The method according to claim 8, comprising the following step of:
   verifying the existence of a user-specific configuration concerning a request to receive notification in order to determine whether a notification is sent or not.

* * * * *